US012112688B2

(12) United States Patent
Kwon et al.

(10) Patent No.: US 12,112,688 B2
(45) Date of Patent: Oct. 8, 2024

(54) DISPLAY APPARATUS AND CONTROLLING METHOD THEREOF FOR MODIFYING OBTAINED AVERAGE BRIGHTNESS VALUE BASED ON HEATING ESTIMATION DATA

(71) Applicant: SAMSUNG ELECTRONICS CO., LTD., Suwon-si (KR)

(72) Inventors: Ohjae Kwon, Suwon-si (KR); Jinyong Park, Suwon-si (KR); Hwaseok Seong, Suwon-si (KR); Jinsung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 17/549,382

(22) Filed: Dec. 13, 2021

(65) Prior Publication Data

US 2023/0043004 A1 Feb. 9, 2023

Related U.S. Application Data

(63) Continuation of application No. PCT/KR2021/016152, filed on Nov. 8, 2021.

(30) Foreign Application Priority Data

Aug. 9, 2021 (KR) ........................ 10-2021-0104581

(51) Int. Cl.
*G09G 3/32* (2016.01)

(52) U.S. Cl.
CPC ....... *G09G 3/32* (2013.01); *G09G 2300/0452* (2013.01); *G09G 2320/0233* (2013.01); (Continued)

(58) Field of Classification Search
CPC ............... G09G 3/32; G09G 2320/041; G09G 2300/0452
See application file for complete search history.

(56) References Cited

U.S. PATENT DOCUMENTS 8,937,587 B2 1/2015 Nakajima
10,510,292 B2 12/2019 Jang
(Continued)

FOREIGN PATENT DOCUMENTS

CN 107545874 A * 1/2018 ........... G09G 3/3258
JP 2006-30336 A 2/2006
(Continued)

OTHER PUBLICATIONS

International Search Report and Written Opinion dated Apr. 29, 2022, issued by the International Searching Authority in International Application No. PCT/KR2021/016152 (PCT/ISA/210 and PCT/ISA/237).

*Primary Examiner* — Benjamin C Lee
*Assistant Examiner* — Nathan P Brittingham
(74) *Attorney, Agent, or Firm* — Sughrue Mion, PLLC

(57) ABSTRACT

A display apparatus may include a display panel including a plurality of light emitting diode (LED) pixels; a panel driver configured to provide a driving signal to the display panel to drive the display panel; a memory storing heating characteristic information of each of a red (R) sub-pixel, a green (G) sub-pixel, and a blue (B) sub-pixel included in each of the plurality of LED pixels; and a processor configured to: obtain an average brightness value corresponding to an input image based on a gray level value of the input image, obtain heating estimation data of the input image based on the gray level value of the input image and the heating characteristic information stored in the memory, modify the obtained average brightness value based on the heating estimation data, and control the panel driver based on the modified average brightness value.

23 Claims, 12 Drawing Sheets

(52) U.S. Cl.
CPC ................. *G09G 2320/041* (2013.01); *G09G 2320/0626* (2013.01)

(56) References Cited

U.S. PATENT DOCUMENTS

| | | | | |
|---|---|---|---|---|
| 10,535,309 | B2 | 1/2020 | Ryu et al. | |
| 10,810,934 | B2 | 10/2020 | Pyo et al. | |
| 11,158,288 | B2 | 10/2021 | Tada | |
| 2008/0245949 | A1* | 10/2008 | Morimoto | G01J 1/32 250/205 |
| 2012/0274544 | A1 | 11/2012 | Nakajima | |
| 2012/0287147 | A1* | 11/2012 | Brown Elliott | G09G 5/02 345/593 |
| 2017/0270848 | A1* | 9/2017 | Liu | G06F 3/04886 |
| 2019/0266941 | A1 | 8/2019 | Pyo et al. | |
| 2020/0020303 | A1 | 1/2020 | Kim et al. | |
| 2020/0111408 | A1 | 4/2020 | Machida et al. | |
| 2021/0035528 | A1* | 2/2021 | Tada | G09G 5/10 |
| 2022/0208065 | A1 | 6/2022 | Kubo | |

FOREIGN PATENT DOCUMENTS

| | | | |
|---|---|---|---|
| JP | 2006-276784 | A | 10/2006 |
| JP | 2006-284399 | A | 10/2006 |
| JP | 2012-237972 | A | 12/2012 |
| JP | 2020-59124 | A | 4/2020 |
| JP | 2021-021854 | A | 2/2021 |
| KR | 10-2017-0135418 | A | 12/2017 |
| KR | 10-2019-0104086 | A | 9/2019 |
| KR | 10-2034062 | B1 | 10/2019 |
| WO | 2020/225906 | A1 | 11/2020 |

* cited by examiner

DISPLAY APPARATUS AND CONTROLLING METHOD THEREOF FOR MODIFYING OBTAINED AVERAGE BRIGHTNESS VALUE BASED ON HEATING ESTIMATION DATA

CROSS-REFERENCE TO RELATED APPLICATION(S)

This application is a bypass continuation of International Application No. PCT/KR2021/016152, filed on Nov. 8, 2021, which is based on and claims priority to Korean Patent Application No. 10-2021-0104581, filed on Aug. 9, 2021, in the Korean Intellectual Property Office, the disclosures of which are incorporated by reference herein in their entireties.

BACKGROUND

1. Field

This disclosure relates to a display apparatus and a controlling method thereof, and more particularly, to a display apparatus including a display panel composed of a self-light emitting device driven by current and a controlling method thereof.

2. Description of the Related Art

Display apparatuses utilizing a micro light emitting diode (LED) including an (LED) having a size of 100 μm or less have been widely used.

In the case of a display apparatus utilizing a micro LED, there is a problem in that light efficiency of red R, green G, or blue B LED is reduced due to heat generated according to the operation of the apparatus. Moreover, regarding the red R LED, in particular, there is a problem that color of an image provided to a user is distorted as the red R LED is more affected by heat rather than the green G or the blue B LED.

SUMMARY

The disclosure provides a display apparatus for adjusting the luminance of a display apparatus based on heating estimation data obtained by analyzing an input image, and a controlling method thereof.

According to an aspect of the disclosure, there is provided a display apparatus including: a display panel including a plurality of light emitting diode (LED) pixels; a panel driver configured to provide a driving signal to the display panel to drive the display panel; a memory storing heating characteristic information of each of a red (R) sub-pixel, a green (G) sub-pixel, and a blue (B) sub-pixel included in each of the plurality of LED pixels; and a processor configured to: obtain an average brightness value corresponding to an input image based on a gray level value of the input image, obtain heating estimation data of the input image based on the gray level value of the input image and the heating characteristic information stored in the memory, modify the obtained average brightness value based on the heating estimation data, and control the panel driver based on the modified average brightness value.

The memory may be further configured to store luminance information according to the average brightness value, and the processor may be further configured to: obtain luminance adjustment information corresponding to the input image based on the heating estimation data, obtain an average brightness compensation value based on the luminance adjustment information and the luminance information stored in the memory, and obtain the modified average brightness value based on the average brightness value corresponding to the input image and the average brightness compensation value.

The processor may be further configured to: based on a heating estimation value corresponding to the input image being greater than or equal to a threshold value, sum the average brightness value corresponding to the input image and the average brightness compensation value to obtain the modified average brightness value, and control the panel driver based on the modified average brightness value.

The heating characteristic information may include heat conversion rate information corresponding to each of the R, G, and B sub-pixels, and the processor may be further configured to: obtain a first heating estimation value for each pixel, among the plurality of LED pixels, by applying the heat conversion rate information corresponding to each of the R, G, and B sub-pixels to each of R, G, and B gray level values included in the input image, obtain a second heating estimation value corresponding to the input image based on at least one of an average value of the obtained first heating estimation value of each of the plurality of LED pixels or a ratio of a pixel region in which the first heating estimation value of each of the plurality of LED pixels is greater than or equal to a first threshold value, and modify the obtained average brightness value based on the second heating estimation value.

The processor may be further configured to: obtain luminance adjustment information corresponding to the input image based on the average value of the first heating estimation value of each of the plurality of LED pixels being greater than or equal to a second threshold value, or obtain the luminance adjustment information corresponding to the input image based on the ratio of the pixel region in which the first heating estimation value of each of the plurality of LED pixels is greater than or equal to the first threshold value being greater than or equal to a threshold ratio.

The processor may be further configured to: adjust the first heating estimation value by applying heat diffusion modeling data to the first heating estimation value, obtain the second heating estimation value corresponding to the input image based on the adjusted first heating estimation value, and modify the obtained average brightness value based on the second heating estimation value.

The display apparatus may further include a plurality of temperature sensors included in a plurality of different regions of the display panel, and the processor may be further configured to: obtain an average temperature value corresponding to the display panel based on a temperature value obtained by each of the plurality of temperature sensors, and based on the average temperature value being greater than or equal to a threshold temperature, control the panel driver based on the modified average brightness value.

The display apparatus may further include a plurality of temperature sensors included in a plurality of different regions of the display panel, and the processor may be further configured to: obtain heat conversion rate information of each of the R, G, and B sub-pixels corresponding to the obtained temperature value by each of the plurality of temperature sensors, obtain a heating estimation value based on the heat conversion rate information of each of the R, G, and B sub-pixels, and modify the obtained average brightness value based on the obtained heating estimation value.

The processor may be further configured to: based on an event occurring, modify the obtained average brightness value based on the heating estimation data of the input image, and control the panel driver based on the modified average brightness value, and the event may include at least one of a moving image reproduction stop event, a still image reproduction event, a graphical user interface (GUI) display event, or a reproduction event for a threshold time or more.

The processor may be further configured to: obtain an average brightness value for each frame, among a plurality of frames, in the input image, obtain heating estimation data for each of the plurality of frames based on the gray level value and the heating characteristic information, modify the average brightness value based on the heating estimation data for each of the plurality of frames, and control the panel driver based on the modified average brightness values by frames.

According to an aspect of the disclosure, there is provided a method of controlling a display apparatus including: obtaining an average brightness value corresponding to an input image based on a gray level value of the input image; obtaining heating estimation data of the input image based on the gray level value of the input image and heating characteristic information of each of a red sub-pixel, a green sub-pixel and a blue sub-pixel included in each of a plurality of light emitting diode (LED) pixels; modifying the obtained average brightness value based on the heating estimation data; and driving a display panel including the plurality of LED pixels based on the modified average brightness value.

The compensating the average brightness value may include: obtaining luminance adjustment information corresponding to the input image based on the heating estimation data; obtaining an average brightness compensation value based on the luminance adjustment information and luminance information according to the average brightness value; and obtaining the modified average brightness value based on the average brightness value corresponding to the input image and the average brightness compensation value.

The compensating the average brightness value may include, based on a heating estimation value corresponding to the input image being greater than or equal to a threshold value, summing the average brightness value corresponding to the input image and the average brightness compensation value to obtain the modified average brightness value.

The heating characteristic information may include heat conversion rate information corresponding to each of the R, G, and B sub-pixels, the obtaining the heating estimation data may include: obtaining a first heating estimation value for each pixel, among the plurality of LED pixels by applying the heat conversion rate information corresponding to each of the R, G, and B sub-pixels to each of R, G, and B gray level values included in the input image; and obtaining a second heating estimation value corresponding to the input image based on at least one of an average value of the obtained first heating estimation value of each of the plurality of LED pixels or a ratio of a pixel region in which the first heating estimation value of each of the plurality of LED pixels is greater than or equal to a first threshold value, and the modifying the average brightness value may include modifying the obtained average brightness value based on the second heating estimation value.

The compensating the average brightness value may include: obtaining luminance adjustment information corresponding to the input image based on the average value of the first heating estimation value of each of the plurality of LED pixels being greater than or equal to a second threshold value; or obtaining the luminance adjustment information corresponding to the input image based on the ratio of the pixel region in which the first heating estimation value of each of the plurality of LED pixels is greater than or equal to the first threshold value being greater than or equal to a threshold ratio.

According to various embodiments of the disclosure, systems, apparatuses and methods are provided to prevent color distortion of an image due to heat generated by driving a display apparatus, thereby improving user convenience.

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through an intervening third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using a display apparatus.

Figure 1:
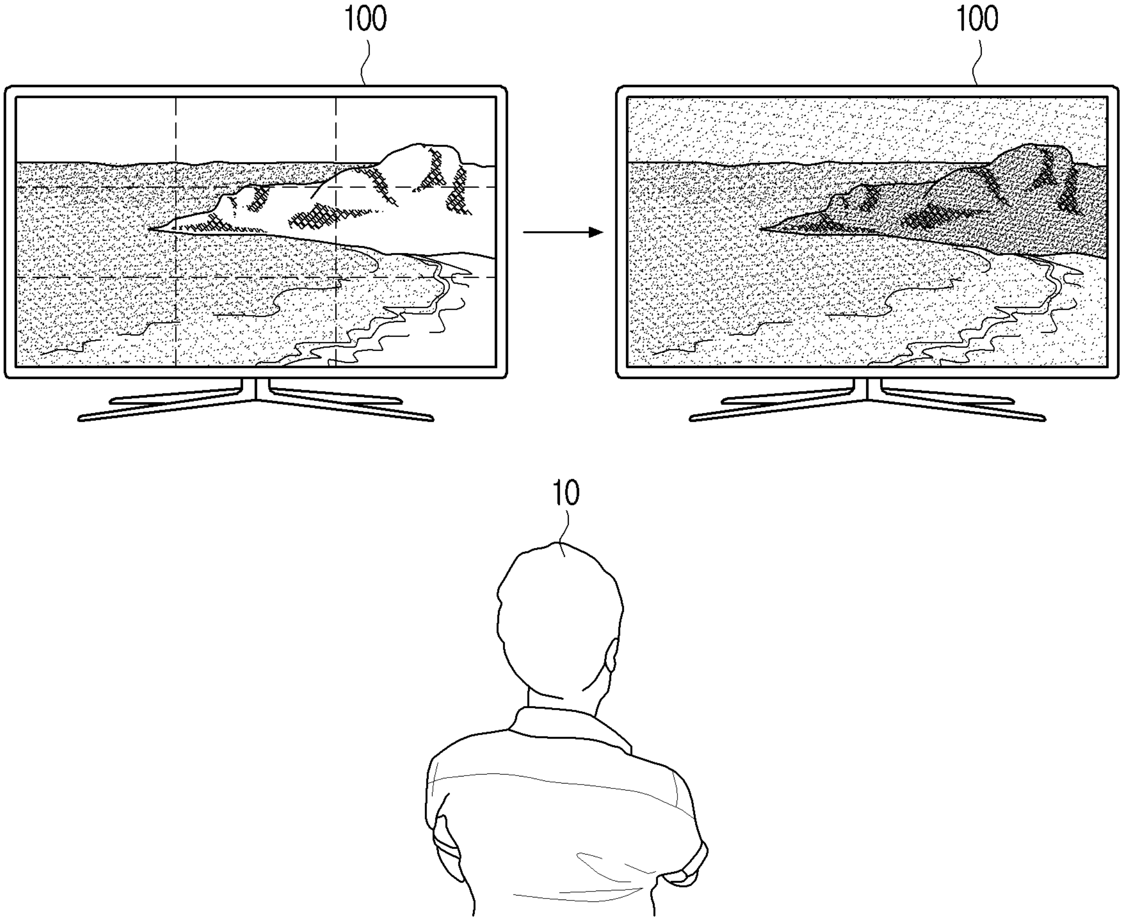
FIG. 1 is a diagram illustrating color distortion of an image provided through a display apparatus.

FIG. 1 is a diagram illustrating color distortion of an image provided through a display apparatus.

Referring to FIG. 1, a display apparatus 100 may output an image and provide the image to a user 10. The display apparatus 100 may include a smart phone, a tablet, a smart TV, an Internet TV, a web TV, an Internet Protocol Television (IPTV), signage, PC, smart TV, monitor, or the like, but is not limited thereto, and may be implemented as various types of apparatuses including a display function, such as a large format display (LFD), a digital signage, digital information display (DID), video wall, projector display, or the like.

The display apparatus 100 may also include a micro LED display panel. In this example, the light efficiency of the LED elements included in the display apparatus 100 may be reduced by the heat generated by the display apparatus 100. Some of the power supplied to the LED element with reduced light efficiency is emitted in the form of heat energy. As such, there is a problem of further reduction in the light efficiency of the LED element and the surrounding LED element.

As heat is generated from the display apparatus 100 during the process of using the display apparatus 100 by the user, the color of the image provided by the display apparatus 100 may be distorted. Specifically, an image provided by the display apparatus 100 appear darker than normal due to heat generation, and in particular, red light emitted from a red (R) LED which is largely affected by heat from other LED elements is relatively reduced, thereby causing distortion of the color of an image.

As shown in FIG. 1, since a bright portion included in the image generates a relatively large amount of heat than a dark portion included in the image, the color distortion in the bright portion may occur more strongly than the color distortion of the dark portion.

The display apparatus 100 according to an embodiment may adjust the luminance of the display apparatus 100 based on the obtained heating estimation data as a result of analyzing the input image in order to solve the problem that the color of the image provided to the user 10 is distorted due to the heating of the apparatus 100.

In general, "luminance" refers to the luminance of an image provided through the display panel 110 or a concept related to the intensity of the driving signal provided to the display panel 110 through a panel driver 120 as illustrated in FIG. 2, but in the disclosure, the luminance of the display apparatus 100 will be described as an example of having the latter meaning.

The display apparatus 100 in which the luminance is adjusted emits less heat than before the luminance is adjusted, thereby reducing the color distortion of the image provided to the user 10. Hereinafter, various embodiments of adjusting the luminance of the display apparatus 100 based on the obtained heating estimation data are described in detail with reference to the input image.

Figure 2A:
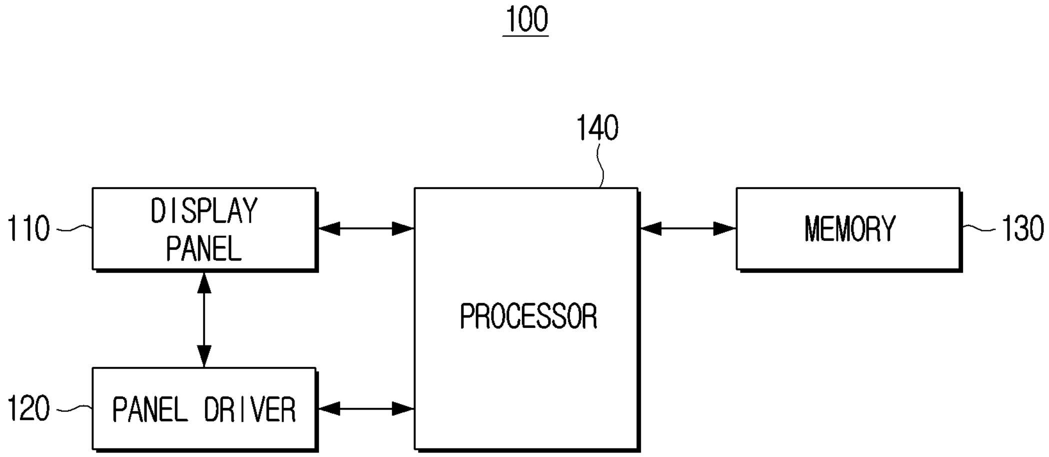
FIGS. 2A and 2B are diagrams illustrating a configuration of a display apparatus according to an embodiment of the disclosure.
Figure 2B:
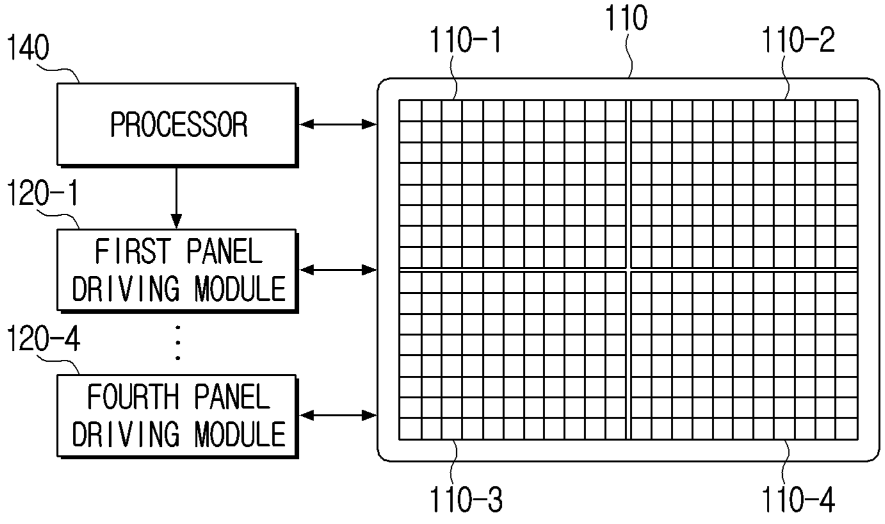

FIGS. 2A and 2B are diagrams illustrating a configuration of a display apparatus according to an embodiment of the disclosure.

Referring to FIG. 2A, the display apparatus 100 may include a display panel 110, a panel driver 120, a memory 130, and a processor 140.

The display panel 110 includes a plurality of pixels, each pixel including a plurality of sub-pixels. For example, each pixel may consist of three sub-pixels corresponding to a plurality of light, e.g., red, green, and blue light (R, G, B). However, the disclosure is not limited thereto, and as such, according to another embodiment, cyan, magenta, yellow, black, or other sub-pixels may be included in addition to the red, green, and blue sub-pixels.

In particular, as shown in FIG. 2B, the display panel 110 may be implemented by connecting and assembling a plurality of display modules 110-1 . . . 110-*n*. Here, each of the plurality of display modules may include a plurality of pixels arranged in a matrix form, for example, self-emitting pixels. According to an embodiment, the display panel 110 may be implemented as a plurality of LED modules (an LED module including at least one LED module) and/or a plurality of LED cabinets. The LED module may also include a plurality of LED pixels, in accordance with one example, an LED pixel may be implemented with an RGB LED, and an RGB LED may include an R LED, a G LED, and a B LED.

The panel driver 120 drives the display panel 110 under the control of the processor 140. For example, the panel driver 120 may drive each of the LED pixels by applying a driving voltage or a driving current to drive each of the LED pixels constituting the display panel 110 under the control of the processor 140.

As shown in FIG. 2B, the panel driver 120 may include a plurality of panel driving modules 120-1 . . . 120-*n* connected to each of the plurality of display modules 110-1 . . . 110-*n*, respectively. The plurality of panel driving modules 120-1 . . . 120-*n* may supply driving current to the plurality of display modules 110-1 . . . 110-*n* to correspond to each control signal input to the processor 140 to be described below, thereby driving the plurality of display modules 110-1 . . . 110-*n*.

The plurality of LED driving modules 120-1 . . . 120-*n* may adjust and output the supply time or intensity, or the like, of the driving current supplied to the plurality of display modules 110-1 . . . 110-*n* to correspond to each control signal input from the processor 140.

Each of a plurality of LED driving modules 120-1 . . . 120-*n* may include a power supply for supplying power. The power supply is hardware that converts an alternating current (AC) to a direct current (DC) so as to be stably used in each of the plurality of display modules 110-1 . . . 110-*n*, and supplies power to suit to each system. The power supply may include an EMI filter, an AC-DC rectifier, a DC-DC switching converter, an output filter, and an output unit. The power supply may be implemented, for example, with a switched mode power supply (SMPS). The SMPS may control the on-off time ratio of the semiconductor switch device to stabilize the output to enable high efficiency, small size, and light weight, and may be used for driving each of the plurality of display modules 110-1 . . . 110-*n*.

However, according to another embodiment, the panel driver 120 may be embodied as a driving module that drives a plurality of SMPS supplying power to each of the plurality of display modules 110-1 . . . 110-*n*.

Each of the plurality of display modules 110-1 . . . 110-*n* may include a sub-processor for controlling an operation of each display module and the plurality of panel driving modules 120-1 . . . 120-4 may drive each display module according to control of the sub-processor. In this example, each sub-processor and the driving module may be implemented as hardware, software, firmware, integrated chip (IC), a combination of hardware and software, or the like. According to an embodiment, each sub-processor may be implemented as a separate semiconductor IC.

The display apparatus 100 according to an embodiment may be a device in which a plurality of display modules 110-1 . . . 110-*n* are implemented as the first to fourth display modules 110-1 to 110-4 and driven by each of the first to fourth panel driving modules 120-1 to 120-4 but the embodiment is not limited thereto.

The memory 130 may store data required for various embodiments of the disclosure. The memory 130 may be implemented as a memory embedded within the display apparatus 100 or a memory detachable from the display apparatus 100 according to the usage of data storage. For example, the data for driving the display apparatus 100 may be stored in the memory embedded within the display apparatus 100, and the data for upscaling of the display apparatus 100 may be stored in the memory detachable from the display apparatus 100. A memory embedded in the display apparatus 100 may be implemented as at least one of a volatile memory such as a dynamic random access memory (DRAM), a static random access memory (SRAM), a synchronous dynamic random access memory (SDRAM), or a non-volatile memory (e.g., one time programmable ROM (OTPROM), programmable ROM (PROM), erasable and programmable ROM (EPROM), EEPROM, mask ROM, flash ROM, a flash memory (e.g., NAND flash or NOR flash), a hard disk drive (HDD), a solid state drive (SSD), or the like. A memory detachably mounted to the display apparatus 100 may be implemented as a memory card (e.g., a compact flash (CF), a secure digital (SD), micro secure digital (micro-SD), a mini secure digital (mini-SD), an extreme digital (xD), a multi-media card (MMC), etc.), an external memory (e.g., a universal serial bus (USB) memory, or the like) connectable to the USB port, or the like.

The memory 130 may store current information of a plurality of display modules 110-1 . . . 110-*n*. The current information may store current control information according to the luminance of each sub-pixel constituting the display circuit. The current control information according to the luminance of each sub-pixel may be current control information according to luminance characteristics calibrated depending on luminance characteristics and color shift characteristics according to the current of each sub-pixel. According to another embodiment, the luminance characteristics is modeled depending on luminance characteristics and color shift characteristics according to the current of each sub-pixel.

The current control information according to the luminance of each sub-pixel may be current gain information for each luminance of each sub-pixel calibrated based on luminance level information according to the current of each sub-pixel and color shift information according to the current of each sub-pixel. For example, the luminance level information according to the current of each sub-pixel may be luminance change information according to a current change for each of the R LED element, G LED element, and B LED element, and the color information according to the current for each sub-pixel may be a color coordinate (e.g., x, y color coordinate) variation according to a current change the R LED element, G LED element, and B LED element.

In this example, the current gain information according to the luminance of each sub-pixel may be a current gain value for luminance of each sub-pixel obtained by calibrating the current value so that the luminance variation of each of the R LED element, G LED element, and B LED element according to current change is similar and color shift by the R LED element, G LED element, and B LED element does not occur according to the current change.

The disclosure is not limited thereto, and as such, according to another embodiment, the current control information may be a current value itself, and not the current gain value.

The memory 130 may store the luminance level information for each power level provided to the display module. As the power supplied to the display module increases, the luminance of the display module may increase, but when the supply power exceeds a predetermined threshold value, the luminance increase rate of the display module may be gradually decreased and may not increase for greater than or equal to the maximum luminance value. Information on the amount of change in the luminance of the display module according to the amount of change in the supply power may be measured and stored in the memory 130.

In this example, the luminance level information for each power level may be the luminance increase information according to the power rise amount. However, the disclosure is not limited thereto, as such, according to another embodiment, any information representing a relation between supply power and luminance may be stored and applied to compensate the distortion in the displayed image.

The memory 130 may store power information of each of the sub-pixels for each gray level. Since the gray level of the image is associated with the luminance value, the power for each of the R LED element, G LED element, and B LED element required to represent the image of the predetermined gray level may be changed. As described above, the power information of each of the R LED element, G LED element, and B LED element for each gray level of the image may be stored in the memory 130.

For example, when a gray level of 256 (when an image has 256 gray levels for each color signal of RGB) or 1024 gray levels (when an image has a gray level of 1024 for each color signal of RGB), power information of each of the R LED element, G LED element, and B LED element for each gray level may be stored in the memory 130. The power information for each gray level may be measured and stored in the memory 130. The power consumption for each gray level may be obtained by measuring the amount of power consumed in the R LED element, G LED element, and B LED element while the images for each gray level are displayed in the display module.

The memory 130 may store information on the maximum luminance for each pixel, information on a color of each pixel, a luminance correction coefficient for each pixel, and the like. Here, the binning group is an LED pixel group having the same characteristics (luminance, color coordinate, etc.) as much as possible for the LED pixels.

For example, a luminance correction coefficient is used to adjust the luminance downward through the calibration in order to match the maximum luminance to the target luminance for uniformity characteristics between the plurality of LED pixels. In this example, the luminance correction coefficient may be a 3×3 matrix format for implementing the target red R luminance, green G luminance and blue B luminance, and a luminance correction coefficient different from each other is applied to each pixel so that the maximum luminance becomes a target luminance, thereby realizing uniformity. The color temperature may also be calibrated to have uniformity, while implementing the target luminance based on a 3*3 matrix type parameter corresponding to each of the R LED element, G LED element, and B LED element.

The memory 130 may store more information about the number of pixels that constitute each of the plurality of display modules, the size of the pixels, and the spacing between pixels.

The memory 130 may also store heating characteristic information for each of the R sub-pixel, G sub-pixel, and B sub-pixel included in the plurality of LED pixels. The heating characteristic information may include, but is not limited to, heat conversion rate information corresponding to each of the R sub-pixel, G sub-pixel, and B sub-pixel.

According to another embodiment, the above-described information stored in the memory 130 may be obtained from an external device without being stored in the memory 130. For example, some information may be received in real time from an external device, such as a set top box, an external server, a user terminal, and the like.

The processor 140 controls the overall operation of the display apparatus 100. The processor 140 may be connected to each configuration of the display apparatus 100 to control the operation of the display apparatus 100 in general. For example, the processor 140 may be connected to the display panel 110, the panel driver 120 and memory 130 to control the operation of the display apparatus 100.

According to an embodiment, the processor 140 may be referred to as various names such as a digital signal processor (DSP), a microprocessor, a central processing unit (CPU), a micro controller unit (MCU), a micro processing unit (MPU), a neural processing unit (NPU), a controller, and an application processor (AP), but will be referred to as the processor 140 herein.

The processor 140 may be implemented as a system on chip (SoC) type or a large scale integration (LSI) type having a processing algorithm built therein, an application specific integrated circuit (ASIC) type, or in a field programmable gate array (FPGA) type. The processor 140 may include volatile memory such as SRAM.

According to an embodiment, the processor 140 may calculate peak luminance level of each of a plurality of display modules 110-1 . . . 110-*n* based on individual consumption power amount calculated for each of the plurality of display modules 110-1 . . . 110-*n*. The processor 140 may control the plurality of panel driving modules 120-1 . . . 120-*n* based on the current information for each luminance stored in the memory 130 so that each of the plurality of display modules 110-1 . . . 110-*n* may have a corresponding peak luminance level.

In this example, the processor 140 may calculate power amount consumed by each of a plurality of display modules 110-1 . . . 110-*n* based on the gray level of an image displayed on each of the plurality of display modules 110-1 . . . 110-*n* and power information of each of sub-pixels by gray levels obtained from the memory 130.

The processor 140 according to an embodiment may obtain an average brightness value corresponding to an input image based on a gray level value of the input image. The average brightness value according to an embodiment may include an average picture level (APL) value, but is not limited thereto. Here, the APL value is determined based on the gray level value of the image displayed through the display panel, and the APL value may increase as the average of the gray level value of each pixel corresponding to the input image is high.

The processor 140 may obtain the heating estimation data of the input image based on the gray level value of the input image and the heating characteristic information stored in the memory 130. The heating estimation data may include data related to a numerical value (hereinafter, a heating estimation value) expected to occur in the corresponding pixel according to the gray level value of each pixel corresponding to the image. In addition, the higher the heating estimation value corresponding to the particular pixel, the higher the temperature of the corresponding pixel.

The processor 140 may obtain a heating estimation value for each pixel based on the heat conversion rate information corresponding to each of the R sub-pixel, G sub-pixel, and B sub-pixel for each of the R gray level, G gray level, and B gray level included in the input image. The heat conversion rate may mean a ratio of the amount of power converted in the form of heat energy among the amount of power supplied to the red R LED, green G LED, and blue B LED.

The processor 140 may obtain a heating estimation value corresponding to the input image based on at least one of the average of the heating estimation value of each pixel and the ratio of the pixel area in which the heating estimation value is the threshold value or higher, and may compensate for the APL value obtained based on the obtained heating estimation value.

The processor 140 may obtain an APL value for each frame of the input image, and obtain heat estimation data for each frame based on the frame-specific gray level value and the heating characteristic information. The processor 140 may compensate the APL value for each frame based on the heating estimation data for each frame and control the panel driver 120 based on the APL value for each frame.

When the heating estimation value corresponding to the input image is equal to or greater than the threshold value, the processor 140 may add (or sum) the APL value corresponding to the input image and the obtained compensated APL value to obtain the modified APL value, and control the panel driver 120 based on the modified APL value. For example, the processor 140 may obtain luminance adjustment information corresponding to the input image if the ratio of a pixel region in which the average value of the heating estimation value is greater than or equal to a threshold value or the heating estimation value is greater than or equal to a threshold value is greater than or equal to a threshold ratio, and control the panel driver 120 to adjust the luminance of the display apparatus 100 based on the obtained luminance adjustment information.

The processor 140 may apply the heat diffusion modeling data to the heating estimation value for each pixel to correct the heating estimation value for each pixel, and obtain a heating estimation value corresponding to the input image based on the corrected value of the heating estimation for each pixel.

According to an embodiment, the processor 140 may compensate the APL value corresponding to the input image based on the obtained heating estimation data. For example, the processor 140 may compensate the APL value when it is identified that the luminance of the display apparatus 100 needs to be adjusted based on the heating estimation data, and adjust the luminance of the display apparatus 100 by controlling the panel driver 120 based on the compensated APL value.

More specifically, the memory 130 may store luminance information according to the APL value, and the processor 140 may obtain luminance adjustment information corresponding to the input image based on the heating estimation data, and obtain the APL compensation value based on the luminance adjustment information and the luminance information according to the APL value stored in the memory 130. The processor 140 may obtain a compensated APL value based on the APL value and the APL compensation value corresponding to the input image, and control the panel driver 120 based on the compensated APL value.

The display apparatus 100 may further include a plurality of temperature sensors included in a plurality of different regions of the display panel 110. The processor 140 may obtain an average temperature value corresponding to the display panel based on a temperature value obtained by each of the plurality of temperature sensors, and may control the panel driver 120 based on the compensated APL value when the average temperature value is greater than or equal to a threshold temperature.

The processor 140 may obtain the heat conversion rate information of each of the R sub-pixel, G sub-pixel, and B sub-pixel corresponding to the temperature values obtained by the plurality of temperature sensors, and may obtain the heat conversion rate information for each pixel based on the obtained heat conversion rate information.

When an event occurs, the processor 140 may compensate the APL value obtained based on the heating estimation data of the input image, and control the panel driver 120 based on the compensated APL value. According to an embodiment, the event may be a predetermined event. The predetermined event may include an event in which color distortion of an image due to the heating of the display apparatus 100 may be worsen.

The predetermined event may include an event in which a driving signal corresponding to a gray level greater than or equal to a threshold value is continuously applied to a specific area of the display panel 110. For example, the predetermined event may include at least one of a video playback stop event, a still image playback event, a GUI display event, or a playback event for at least a threshold time, but is not limited thereto.

Figure 3:
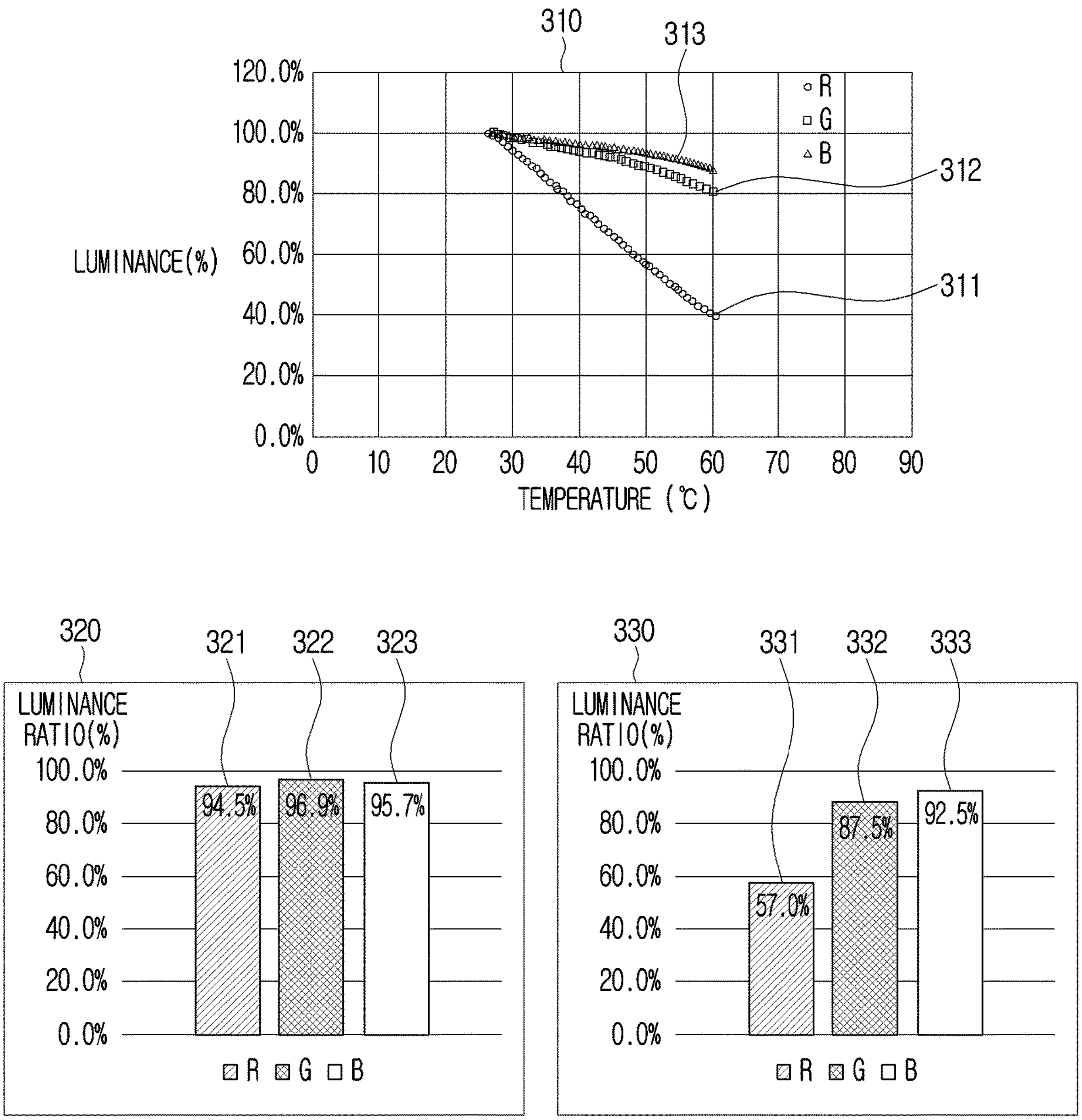
FIG. 3 is a diagram illustrating heating characteristic information according to an embodiment of the disclosure.

FIG. 3 is a diagram illustrating heating characteristic information according to an embodiment of the disclosure.

According to an embodiment, the heating characteristic information stored in the memory 130 may include heat conversion rate information corresponding to R sub-pixel, G sub-pixel, and B sub-pixel included in the plurality of LED pixels. The heat conversion rate may mean a ratio of the amount of power converted in the form of heat energy among the amount of power supplied to the R LED element, G LED element, and B LED element, and the heat conversion rate of each of the LED elements may indicate increasing tendency as the light efficiency of each LED light emitting element decreases.

Referring to FIG. 3, the light efficiency corresponding to each of the R sub-pixel, G sub-pixel, and B sub-pixel included in the LED pixel may be expressed as the ratio of the actual luminance to the theoretical luminance (hereinafter, the luminance ratio). The luminance ratio corresponding to each of the R sub-pixel, the G sub-pixel, and the B sub-pixel may decrease as the temperature of the surrounding environment increases (310). According to an embodiment, light efficiency 311 corresponding to the R sub-pixel may be largely affected by a temperature higher than that of the light efficiency 312 and 313 corresponding to the G or B sub-pixel.

The light efficiency 321 corresponding to the R sub-pixel at room temperature (320) may be 94.5%, the light efficiency 322 corresponding to the G sub-pixel may be 96.9%, and the light efficiency 323 corresponding to the B sub-pixel may be 95.7%. When the temperature rises to 50° C. (330), the light efficiency 331 corresponding to the R sub-pixel may be 57.0%, the light efficiency 332 corresponding to the G sub-pixel is 87.5%, and the light efficiency 323 corresponding to the B sub-pixel may be 92.5%

As described above, since the light efficiency corresponding to the R sub-pixel rapidly decreases as the temperature rises, the heat conversion rate corresponding to the R sub-pixel may increase rapidly as the temperature rises. The heat conversion rate corresponding to the G sub-pixel or B sub-pixel may have a tendency to gradually increase more than the heat conversion rate corresponding to the R sub-pixel even if the temperature rises.

According to an embodiment, the processor 140 may obtain the heat conversion rate information of each of the R sub-pixel, the G sub-pixel, and the B sub-pixel, obtain a heating estimation value for each pixel based on the obtained heat conversion rate information, and obtain a heating estimation value corresponding to the input image based on at least one of the average value of the heating estimation value for each pixel or the ratio of the pixel area having the heating estimation value equal to or greater than the threshold value.

Figure 4:
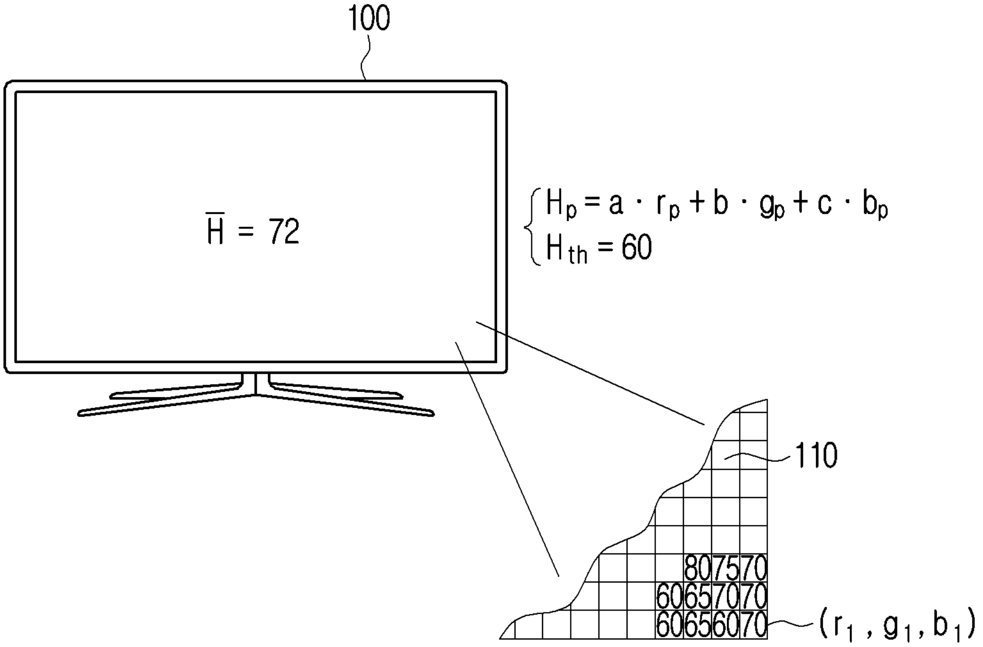
FIG. 4 is a diagram illustrating an image analysis method based on an average heating value according to an embodiment of the disclosure.

FIG. 4 is a diagram illustrating an image analysis method based on an average heating value according to an embodiment of the disclosure.

According to an embodiment of the disclosure, the processor 140 may apply heat conversion rate information corresponding to each of the R sub-pixel, the G sub-pixel, and the B sub-pixel included in the input image to obtain a heating estimation value for each pixel. Specifically, the R gray level value, G gray level value, and B gray level value corresponding to arbitrary pixels included in the display panel 110 may be represented by ($r_p$, $g_p$, $b_p$). In addition, the heat conversion rate information corresponding to each of the R sub-pixel, the G sub-pixel, and the B sub-pixel may include a pair of coefficients (a, b, c) multiplied by the R gray level value, G gray level value, and B gray level value. The processor 140 may obtain a heating estimation value $H_p$, for each pixel as a result of applying the heat conversion rate information corresponding to each of the R sub-pixel, the G sub-pixel, and the B sub-pixel to each of the R gray level value, G gray level value, and B gray level value.

For example, the R gray level value, G gray level value, and B gray level value of the pixels located at the right lower end of the display panel 110 may be expressed as ($r_1$, $g_1$, $b_1$), and the processor 140 may apply heat conversion rate information corresponding to each of the R sub-pixel, the G sub-pixel, and the B sub-pixel to each of the gray level values of the corresponding pixel to identify that the heating estimation value of the corresponding pixel is 70. The processor 140 may obtain an average value ($\overline{H}$) of the heating estimation value of all pixels included in the display panel 110 as a heating estimation value corresponding to the input image.

The processor 140 may identify that the luminance of the display apparatus 100 needs to be adjusted when the "72" identified as the heating estimation value corresponding to the input image is greater than or equal to the threshold value $H_{th}$, and obtain luminance adjustment information corresponding to the input image. The processor 140 may adjust the luminance of the display apparatus 100 based on the luminance adjustment information.

Figure 5:
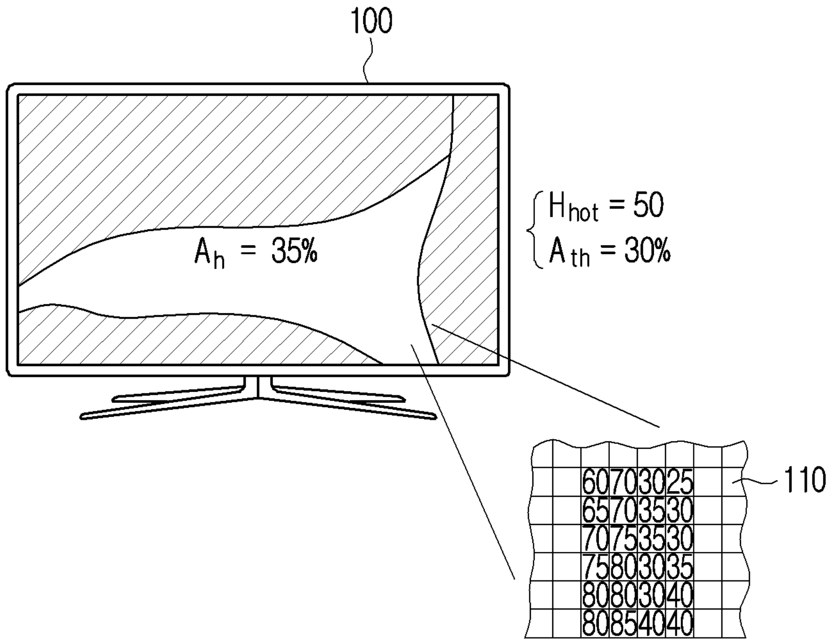
FIG. 5 is a diagram illustrating an image analysis method based on a heating area ratio according to an embodiment of the disclosure.

FIG. 5 is a diagram illustrating an image analysis method based on a heating area ratio according to an embodiment of the disclosure.

According to an embodiment of the disclosure, the processor 140 may obtain a heating estimation value $H_p$ for each pixel as a result of applying heat conversion rate information corresponding to each of the R sub-pixel, the G sub-pixel, and the B sub-pixel of each pixel included in the display panel 110. The processor 140 may identify a ratio of the pixel area where the heating estimate value is greater than or equal to the threshold value $H_{hot}$. For example, the processor 140 may obtain a ratio $A_h$ of the pixel area identified to be greater than or equal to the threshold value 50 to a heating estimation value corresponding to the input image.

The processor 140 may obtain luminance adjustment information corresponding to the input image when the obtained heating estimation value 35% is estimated to be greater than or equal to the threshold value $A_{th}$, and adjust the luminance of the display apparatus 100 based on the obtained luminance adjustment information.

Figure 6:
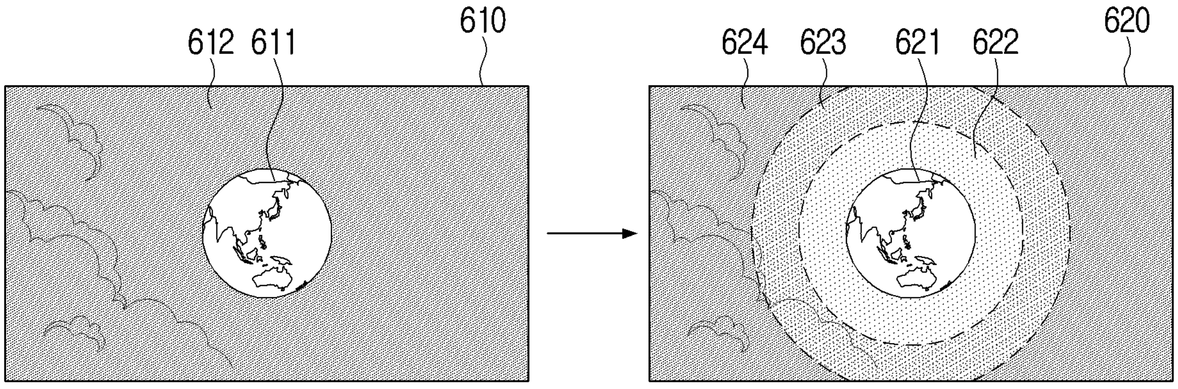
FIG. 6 is a diagram illustrating an image analysis method utilizing heat diffusion modeling data according to an embodiment of the disclosure.

FIG. 6 is a diagram illustrating an image analysis method utilizing heat diffusion modeling data according to an embodiment of the disclosure.

According to an embodiment of the disclosure, the processor 140 may apply heat diffusion modeling data to a heating estimation value for each pixel to correct a heating estimation value for each pixel. Here, the heat diffusion modeling may refer to a technique for estimating the temperature of a plurality of pixels included in the display panel 110 in consideration that heat generated in a specific pixel affects at least one pixel located near the corresponding pixel, but is not limited thereto.

Referring to FIG. 6, the processor 140 may obtain a heating estimation value for each pixel for the input image before applying the heat diffusion modeling (610). Since the Earth 611, which is located in the middle of the image, includes a pixel having a bright gray value, the heating estimation value corresponding to the Earth 611 may have a relatively high value. Since a region 612 other than the Earth 611 includes a pixel having a low gray level value, the heating estimation value for the corresponding region 612 may have a relatively low value.

The processor 140 may correct the heating estimation value of the image based on the image 620 to which the heat diffusion modeling is applied to the input image. For example, the processor 140 may identify that a region 622 adjacent to the Earth 621 as having the highest temperature in a region other than earth 621 according to the spread of heat generated from the pixels contained in the earth 621 among regions 622, 623 located within a critical distance from the earth 621 in the image 620 applied to the heat diffusion modeling.

The processor 140 may identify that a region 623 located far from the Earth 621, among the regions 622, 623 within a critical distance from earth 621 as having a relatively low temperature compared to the region 622 close to the earth 621, and identify that the other region 624 as having the lowest temperature in the region contained in the image 620.

The processor 140 may identify a temperature corresponding to each region in the image 620 to which the heat diffusion modeling is applied, and correct a heating estimation value for each pixel obtained for the input image based on the identified temperature for each region. The processor 140 may obtain a heating estimation value corresponding to the input image based on the corrected value of the heating for each pixel, and compensate for an APL value of the input image based on the obtained heating estimation value.

Figure 7:
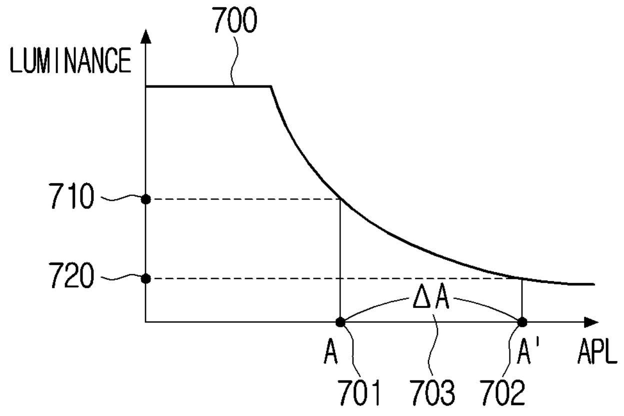
FIG. 7 is a diagram illustrating a luminance adjustment method according to an APL adjustment according to an embodiment of the disclosure.

FIG. 7 is a diagram illustrating a luminance adjustment method according to an APL adjustment according to an embodiment of the disclosure.

The memory 130 may store the luminance information 700 according to the APL value. The processor 140 may obtain an APL value 701 corresponding to the input image, identify the luminance 710 of the display apparatus 100 based on the obtained APL value 701, and control the panel driver 120 based on the identified luminance 710. Since the power supplied to the display panel 110 is limited, the luminance value corresponding to the input image having the APL greater than the threshold value may have a relationship inversely proportional to the APL of the image.

The processor 140 may obtain luminance adjustment information based on the heating estimation data corresponding to the input image. For example, the processor 140 may obtain luminance adjustment information if it is identified that the display apparatus 100 operating with the normal operating luminance 710 needs to operate with the reduced luminance 720 based on the heating estimation data corresponding to the input image, and the luminance adjustment information according to one example may include information about the normal operating luminance 710 and the reduced luminance 720.

The processor 140 may obtain an APL compensation value 703 based on the luminance adjustment information and the luminance information according to the APL value stored in the memory 130, and obtain the compensated APL value 702 compensated based on the APL value 701 and the APL compensation value 703 corresponding to the input image. The processor 140 may add the APL value 701 and the APL compensation value 703 corresponding to the input image when the heating estimation value corresponding to the input image is greater than or equal to a threshold value to obtain the compensated APL value 702, and control the panel driver 120 based on the compensated APL value 702 to control the display apparatus 100 to operate with the reduced luminance 720.

Figure 8:
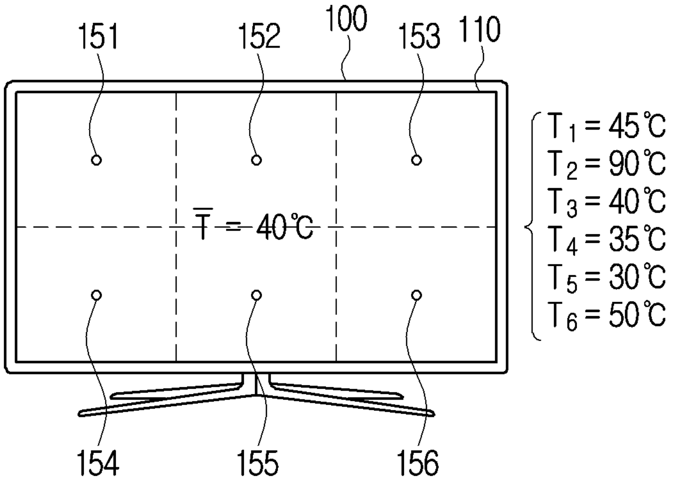
FIG. 8 is a diagram illustrating a method of adjusting luminance of a display apparatus having a temperature sensor according to an embodiment of the disclosure.

FIG. 8 is a diagram illustrating a method of adjusting brightness of a display apparatus having a temperature sensor according to an embodiment of the disclosure.

The display apparatus 100 may include a plurality of temperature sensors 151 to 156 included in a plurality of different regions of the display panel 110. For example, the display apparatus 100 may include a plurality of LED modules included in the display panel 110 and/or a plurality of temperature sensors 151 to 156, each of which is provided in a region corresponding to the plurality of LEDs.

The processor 140 may obtain an average temperature value corresponding to the display panel 110 based on the temperature value obtained through the plurality of temperature sensors 151 through 156. The processor 140 may obtain an average temperature value corresponding to the display panel 110 based on temperature values other than a temperature value identified to have a measurement error among the temperature values obtained through the plurality of temperature sensors 151 to 156. For example, if the measurable temperature range of the plurality of temperature sensors 151 to 156 is 10° C. to 60° C., the processor 140 may identify the average temperature value 40° C. of the second temperature sensor 151, which is the average of the temperature values other than the measurable temperature range $T_2$, as an average temperature value corresponding to the display panel 110. Here, $T_2$ is 90° C., which is above the measurable temperature range of 10° C. to 60° C.

According to an embodiment, the processor 140 may obtain an average temperature value corresponding to the display panel 110 based on the remaining temperature values other than the highest measurement value $T_6$ of of the temperature value and the lowest measurement value $T_6$ among the temperature values other than the temperature value identified as having the measurement error, but is not limited thereto.

The processor 140 may control the panel driver 120 based on the compensated APL value if the obtained average temperature value is greater than or equal to the threshold temperature. For example, the processor 140 may adjust the luminance of the display apparatus 100 by controlling the panel driver 120 based on the APL value compensated based on the average temperature value 40° C. corresponding to the display panel 110 being higher than or equal to the threshold temperature 35° C.

The processor 140 may obtain the heat conversion rate information of each of the R, G, and B sub-pixels corresponding to the temperature values obtained by the plurality of temperature sensors 151 to 156, and may obtain the heat conversion rate information for each pixel based on the obtained heat conversion rate information. For example, the processor 140 may identify that the 45° C. obtained by the first temperature sensor 151 is a temperature value corresponding to a plurality of LEDs included in the first LED module 110-1 in which the first temperature sensor 151 is located, obtain heat conversion rate information corresponding to the R, G, and B sub-pixels based on 45° C., and obtain a heating estimation value for each of the plurality of pixels included in the first LED module 110-1 based on the obtained heat conversion rate information.

Figure 9:
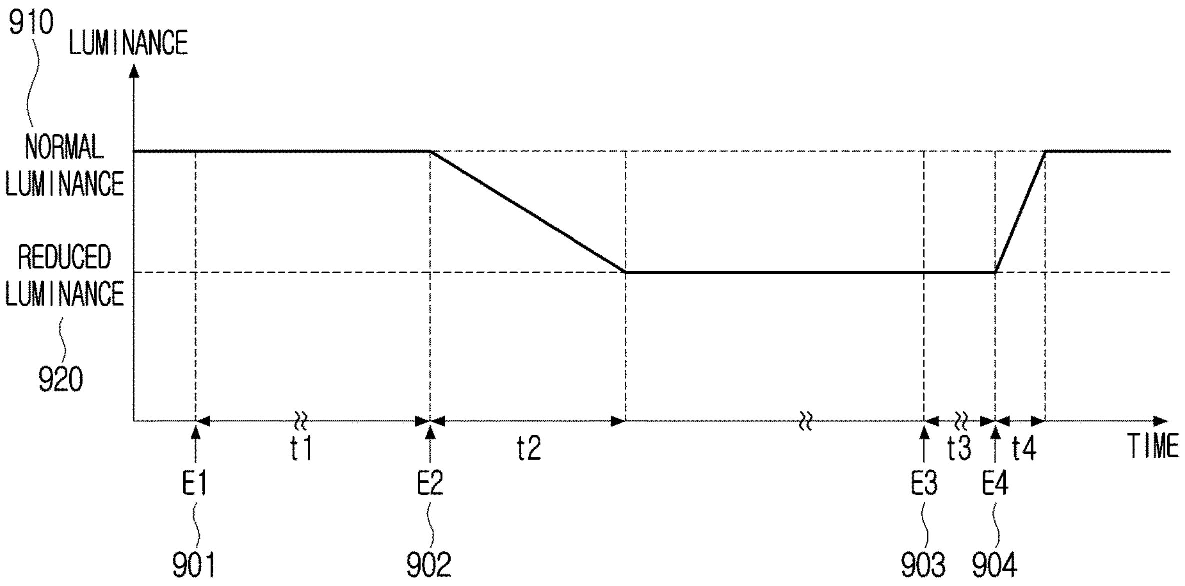
FIG. 9 is a diagram illustrating a luminance adjustment method based on preset event occurrence according to an embodiment of the disclosure.

FIG. 9 is a diagram illustrating a brightness adjustment method based on an event occurrence according to an embodiment of the disclosure.

When an event occurs, the processor 140 may compensate the APL value obtained based on the heating estimation data of the input image, and control the panel driver 120 based on the compensated APL value. The event may be a predetermined event.

For example, after an event E1 901 in which reproduction of an image provided by the display apparatus 100 operating with a normal operation luminance 910 is stopped occurs, an event E2 902 in which the average temperature value obtained through the temperature sensor 150 is greater than or equal to the threshold temperature may occur. If the time interval t1 at which the event E2 is generated after the event E1 is identified as being greater than or equal to a threshold time, the processor 140 may compensate for the APL value of the input image to be increased over a time period t2 based on the heating estimation data corresponding to the input image, and control the panel driver 120 based on the compensated APL value to operate the display apparatus 100 with the reduced luminance 920.

After an event E3 903 in which the reproduction of the image which was stopped while the display apparatus 100 is operating with the reduced luminance 920 occurs, an event E4 904 in which the average temperature value obtained through the temperature sensor 150 is identified to be less than a threshold temperature may occur. In this example, the processor 140 may compensate the APL value of the input image to be reduced over a time t4 based on the heating estimation data corresponding to the input image, and control the panel driver 120 based on the compensated APL value to control the display apparatus 100 to operate in the normal operation luminance 910.

The time t2 required for the display apparatus 100 to operate from the normal operation luminance 910 to the reduced luminance 920 may be shorter than the time t4 required for the display apparatus 100 to operate from the reduced luminance 920 to the normal operation luminance 910, but the embodiment is not limited thereto.

Figure 10:
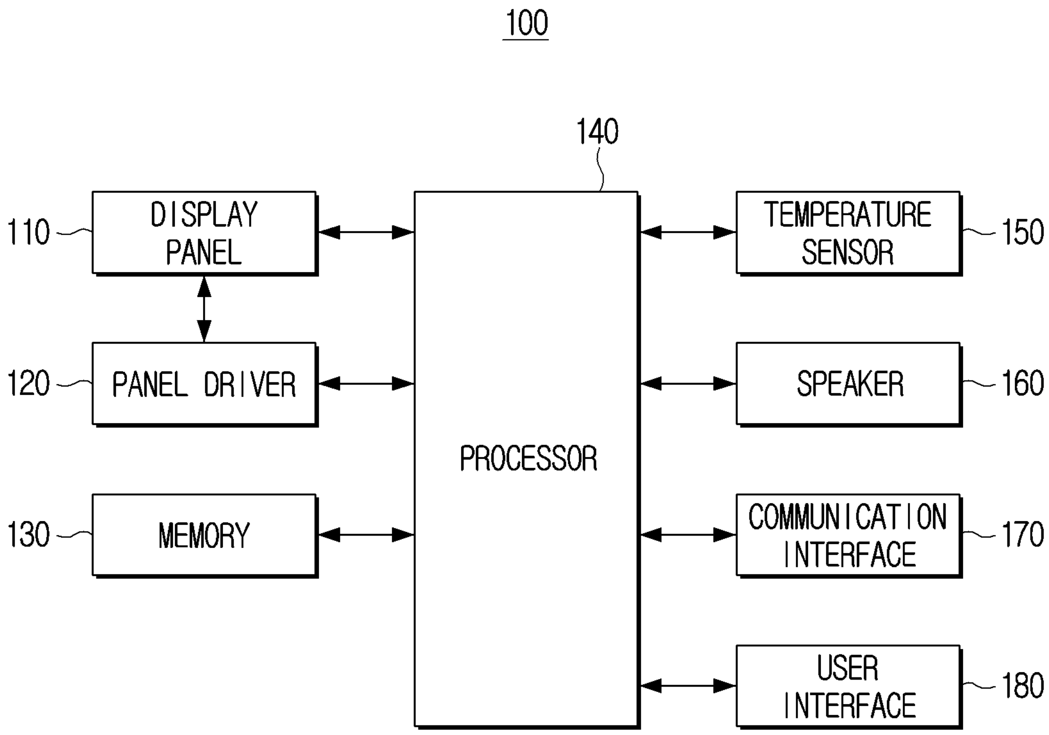
FIG. 10 is a diagram illustrating a functional configuration of a display apparatus according to an embodiment of the disclosure.

FIG. 10 is a diagram illustrating a functional configuration of a display apparatus according to an embodiment of the disclosure.

Referring to FIG. 10, the display apparatus 100 may include the display panel 110, the panel driver 120, the memory 130, the processor 140, the temperature sensor 150, a speaker 160, a communication interface 170, and a user interface 180. In the configuration shown in FIG. 10, a detailed description of the overlapping configuration with FIG. 2A will be omitted.

The temperature sensor 150 is a device that may measure the temperature of the surface of the display panel 110. The temperature sensor 150 according to an embodiment may include a plurality of temperature sensors 151-156 provided in a plurality of different regions of the display panel 110, and the plurality of temperature sensors 151-156 may be included in a plurality of LED modules included in the display panel 110 and/or a region corresponding to a plurality of LEDs, but the disclosure is not limited thereto. For example, the number of temperature sensors may vary.

The speaker 160 is a device to convert an electrical sound signal generated from the processor 140 corresponding to an input image of the display apparatus 100 into a sound wave. The speaker 160 may include a permanent magnet, a coil, and a vibration plate, and may output sound by vibrating the vibration plate by electromagnetic interaction between the permanent magnet and the coil.

When the processor 140 performs an operation related to the luminance adjustment of the display apparatus 100, the processor 140 may control the speaker 160 to output a guide voice related to the corresponding operation.

The communication interface 170 may input and output various types of data. For example, the communication interface 170 may receive and transmit various types of data with an eternal device (e.g., source device), external storage medium (e.g., USB memory), external server (e.g., web hard) through communication methods such as an access point (AP)-based wireless fidelity (Wi-Fi) (wireless local area network (WLAN)), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The communication interface 170 may receive information related to an input image from an external server or may receive various types of data necessary to update information related to the luminance adjustment of the display apparatus 100.

The user interface 180 is configured to be involved in performing interaction with the user by the display apparatus 100. For example, the user interface 180 may include at least one of a touch sensor, a motion sensor, a button, a jog dial, a switch, or a microphone, but is not limited thereto.

The user may check various information related to the luminance adjustment of the display apparatus 100 through the user interface 180 or change the corresponding information. For example, the user may change the various types of threshold values associated with the heating estimate data via the user interface 180.

Figure 11:
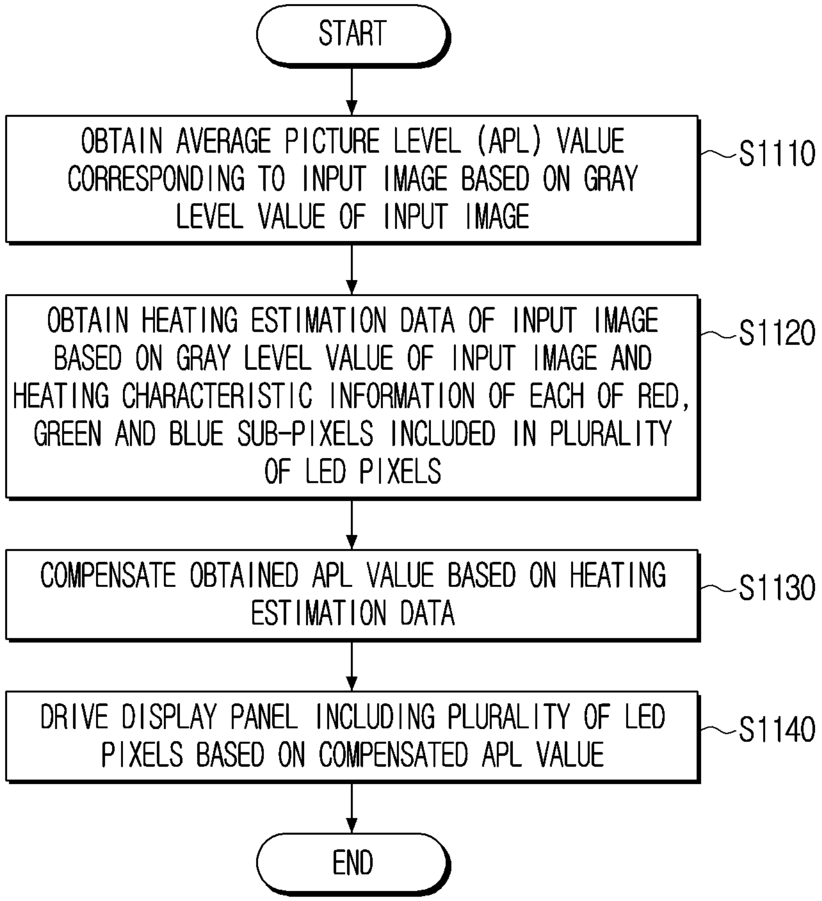
FIG. 11 is a flowchart illustrating a control method according to an embodiment of the disclosure.

FIG. 11 is a flowchart illustrating a control method according to an embodiment of the disclosure.

A controlling method according to an embodiment may include obtaining an average brightness value corresponding to an input image based on a gray level value of the input image in operation S1110. The average brightness value according to an embodiment may include an average picture level (APL) value, but is not limited thereto.

In operation S1120, heating estimation data of the input image based on a gray level value of the input image and heating characteristic information of each of red, green and blue sub-pixels included in a plurality of light emitting diode (LED) pixels may be obtained.

In operation S1130, the obtained APL value based on the heating estimation data may be compensated.

In operation S1140, the display panel including the plurality of LED pixels based on the compensated APL value may be driven.

According to an embodiment, the compensating the APL value in operation S1130 may include obtaining luminance adjustment information corresponding to the input image based on the heating estimation data; obtaining an APL compensation value based on the luminance adjustment information and luminance information according to the APL value; and obtaining the compensated APL value based on the APL value corresponding to the input image and the APL compensation value.

The compensating the APL value in operation S1130 may include, based on a heating estimation value corresponding to the input image being greater than or equal to a threshold value, summing the APL value corresponding to the input image and the APL compensation value to obtain the compensated APL value.

The heating characteristic information may include heat conversion rate information corresponding to each of the red R sub-pixel, green G sub-pixel, and blue B sub-pixel, and the obtaining the heating estimation data in operation S1120 may include obtaining a heating estimation value by pixels by applying heat conversion rate information corresponding to each of the red R sub-pixel, green G sub-pixel, and blue B sub-pixel to each of R gray level value, G gray level value, and B gray level value included in the input image; and obtaining a heating estimation value corresponding to the input image based on at least one of an average value of the obtained heating estimation value by pixels or a ratio of a pixel region in which the heating estimation value is greater than or equal to a threshold value. The compensating the APL value in operation S1130 may include compensating the obtained APL value based on the heating estimation value.

The compensating the APL value in operation S1130 may include obtaining luminance adjustment information corresponding to the input image based on the average value of the heating estimation value being greater than or equal to a threshold value or obtaining luminance adjustment information corresponding to the input image based on a ratio of a pixel region in which the heating estimation value is greater than or equal to a threshold value being greater than or equal to a threshold ratio.

The obtaining heating estimation data in operation S1120 may include adjusting a heating estimation value for each pixel by applying heat diffusion modeling data to the heating estimation value for each pixel; and obtaining a heating estimation value corresponding to the input image based on the corrected value of the heat generation for each pixel. In operation S1130 of compensating the APL value, the APL value obtained based on the heating estimation value may be compensated.

The controlling method may further include obtaining an average temperature value corresponding to the display panel based on a temperature value obtained by each of the plurality of temperature sensors included in a plurality of different regions of the display panel. In operation S1140 of driving the display panel, the display panel may be driven based on the compensated APL value when the average temperature value is greater than or equal to the threshold temperature.

The obtaining heating estimation data in operation S1120 may include obtaining heat conversion rate information of each of the red R sub-pixel, the green G sub-pixel, and the blue B sub-pixel corresponding to the temperature value obtained by each of a plurality of temperature sensors included in a plurality of different regions of the display panel, and obtaining the heating estimation value by pixels based on the heat conversion rate information of each of the red R sub-pixel, the green G sub-pixel, and the blue B sub-pixel.

In operation S1140 of driving the display panel, when an event is generated, the APL value obtained based on the heating estimation data of the input image may be compensated, and the display panel may be driven based on the compensated APL value. Here, the event may be a predetermined event, which may include at least one of a video reproduction stop event, a still image reproduction event, a GUI display event, or a reproduction event greater than or equal to a threshold time.

In operation S1110 of obtaining the APL value, an APL value may be obtained for each frame of the input image. In operation S1120 of obtaining heating estimation data, the heating estimation data for each frame may be obtained based on the frame-specific gray level value and the heating characteristic information. In operation S1130 of compensating the APL value, the APL value for each frame may be compensated based on the heating estimation data for each frame. Finally, in operation S1140 of driving the display panel, the display panel may be driven based on the APL value for each compensated frame.

The methods according to the various embodiments of the disclosure may be implemented as a type of an application installable in an existing display apparatus.

In addition, the methods according to various embodiments may be implemented only with software upgrade or hardware upgrade for the conventional display apparatus.

The various embodiments may be performed through an embedded server provided in the display apparatus or at least one external server.

The various embodiments described above may be implemented in a recordable medium which is readable by a computer or a device similar to the computer using software, hardware, or the combination of software and hardware. In some cases, embodiments described herein may be implemented by the processor 140 itself. According to a software implementation, embodiments such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the display apparatus 100 according to the various embodiments described above when executed by the processor of the particular device.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While embodiments of the disclosure have been shown and described, the disclosure is not limited to the aforementioned specific embodiments, and it is apparent that various modifications can be made by those having ordinary skill in the technical field to which the disclosure belongs, without departing from the scope of the disclosure as claimed by the appended claims. Also, it is intended that such modifications are not to be interpreted independently from the technical idea or prospect of the disclosure.

What is claimed is:

1. A display apparatus comprising:

a display panel comprising a plurality of light emitting diode (LED) pixels;

a panel driver configured to provide a driving signal to the display panel to drive the display panel;

a memory storing heating characteristic information of each of a red (R) sub-pixel, a green (G) sub-pixel, and a blue (B) sub-pixel included in each of the plurality of LED pixels; and a processor configured to:

obtain an average brightness value corresponding to an input image based on a gray level value of the input image, obtain heating estimation data of the input image based on the gray level value of the input image and the heating characteristic information stored in the memory, the heating characteristic information including power information of each of the R sub-pixel, the G sub-pixel, and the B sub-pixel separately correlated for each gray level, modify the obtained average brightness value based on the heating estimation data, and control the panel driver based on the modified average brightness value, wherein the heating characteristic information comprises a first rate of change of heat conversion corresponding to a first color sub-pixel among the R sub-pixel, the G sub-pixel, and the B sub-pixel, and a second rate of change of heat conversion corresponding to a second color sub-pixel among the R sub-pixel, the G sub-pixel, and the B sub-pixel, and wherein the first rate of change increases faster than the second rate of change corresponding to an increase in temperature.

2. The display apparatus of claim 1, wherein the memory further stores luminance information according to the average brightness value, and wherein the processor is further configured to:

obtain luminance adjustment information corresponding to the input image based on the heating estimation data, obtain an average brightness compensation value based on the luminance adjustment information and the luminance information stored in the memory, and obtain the modified average brightness value based on the average brightness value corresponding to the input image and the average brightness compensation value.

3. The display apparatus of claim 2, wherein the processor is further configured to:

based on a heating estimation value corresponding to the input image being greater than or equal to a threshold value, sum the average brightness value corresponding to the input image and the average brightness compensation value to obtain the modified average brightness value, and control the panel driver based on the modified average brightness value.

4. The display apparatus of claim 1, wherein the heating characteristic information comprises heat conversion rate information corresponding to each of the R, G, and B sub-pixels, and wherein the processor is further configured to:

obtain a first heating estimation value for each pixel, among the plurality of LED pixels, by applying the heat conversion rate information corresponding to each of the R, G, and B sub-pixels to each of R, G, and B gray level values included in the input image, obtain a second heating estimation value corresponding to the input image based on at least one of an average value of the obtained first heating estimation value of each of the plurality of LED pixels or a ratio of a pixel region in which the first heating estimation value of each of the plurality of LED pixels is greater than or equal to a first threshold value, and modify the obtained average brightness value based on the second heating estimation value.

5. The display apparatus of claim 4, wherein the processor is further configured to:

obtain luminance adjustment information corresponding to the input image based on the average value of the first heating estimation value of each of the plurality of LED pixels being greater than or equal to a second threshold value, or obtain the luminance adjustment information corresponding to the input image based on the ratio of the pixel region in which the first heating estimation value of each of the plurality of LED pixels is greater than or equal to the first threshold value being greater than or equal to a threshold ratio.

6. The display apparatus of claim 4, wherein the processor is further configured to:

adjust the first heating estimation value by applying heat diffusion modeling data to the first heating estimation value, obtain the second heating estimation value corresponding to the input image based on the adjusted first heating estimation value, and modify the obtained average brightness value based on the second heating estimation value.

7. The display apparatus of claim 1, further comprising:

a plurality of temperature sensors included in a plurality of different regions of the display panel, wherein the processor is further configured to:

obtain an average temperature value corresponding to the display panel based on a temperature value obtained by each of the plurality of temperature sensors, and based on the average temperature value being greater than or equal to a threshold temperature, control the panel driver based on the modified average brightness value.

8. The display apparatus of claim 1, further comprising:

a plurality of temperature sensors included in a plurality of different regions of the display panel, wherein the processor is further configured to:

obtain heat conversion rate information of each of the R, G, and B sub-pixels corresponding to a temperature value obtained by each of the plurality of temperature sensors, obtain the heating estimation data based on the heat conversion rate information of each of the R, G, and B sub-pixels, and modify the obtained average brightness value based on the obtained heating estimation data.

9. The display apparatus of claim 1, wherein the processor is further configured to:

based on an event occurring, modify the obtained average brightness value based on the heating estimation data of the input image, and control the panel driver based on the modified average brightness value, and wherein the event comprises at least one of a moving image reproduction stop event, a still image reproduction event, a graphical user interface (GUI) display event, or a reproduction event for a threshold time or more.

10. The display apparatus of claim 1, wherein the processor is further configured to:

obtain an average brightness value for each frame, among a plurality of frames, in the input image, obtain the heating estimation data for each of the plurality of frames based on the gray level value and the heating characteristic information, modify the average brightness value based on the heating estimation data for each of the plurality of frames, and control the panel driver based on the modified average brightness value by frames.

11. The display apparatus of claim 1, wherein the heating characteristic information comprises first heating characteristic information corresponding to the R sub-pixel, second heating characteristic information corresponding to the G sub-pixel, and third heating characteristic information corresponding to the B sub-pixel.

12. A method of controlling a display apparatus comprising:

obtaining an average brightness value corresponding to an input image based on a gray level value of the input image;

obtaining heating estimation data of the input image based on the gray level value of the input image and heating characteristic information of each of a red (R) sub-pixel, a green (G) sub-pixel and a blue (B) sub-pixel included in each of a plurality of light emitting diode (LED) pixels, the heating characteristic information including power information of each of the red-R sub-pixel, the G sub-pixel, and the B sub-pixel separately correlated for each gray level;

modifying the obtained average brightness value based on the heating estimation data; and driving a display panel including the plurality of LED pixels based on the modified average brightness value, wherein the heating characteristic information comprises a first rate of change of heat conversion corresponding to a first color sub-pixel among the R sub-pixel, the G sub-pixel, and the B sub-pixel, and a second rate of change of heat conversion corresponding to a second color sub-pixel among the R sub-pixel, the G sub-pixel, and the B sub-pixel, and wherein the first rate of change increases faster than the second rate of change corresponding to an increase in temperature.

13. The method of claim 12, wherein the compensating the average brightness value comprises:

obtaining luminance adjustment information corresponding to the input image based on the heating estimation data;

obtaining an average brightness compensation value based on the luminance adjustment information and luminance information according to the average brightness value; and obtaining the modified average brightness value based on the average brightness value corresponding to the input image and the average brightness compensation value.

14. The method of claim 13, wherein the compensating the average brightness value comprises, based on a heating estimation value corresponding to the input image being greater than or equal to a threshold value, summing the average brightness value corresponding to the input image and the average brightness compensation value to obtain the modified average brightness value.

15. The method of claim 12, wherein the heating characteristic information comprises heat conversion rate information corresponding to each of the R, G, and B sub-pixels, wherein the obtaining the heating estimation data comprises:

obtaining a first heating estimation value for each pixel, among the plurality of LED pixels by applying the heat conversion rate information corresponding to each of the R, G, and B sub-pixels to each of R, G, and B gray level values included in the input image; and obtaining a second heating estimation value corresponding to the input image based on at least one of an average value of the obtained first heating estimation value of each of the plurality of LED pixels or a ratio of a pixel region in which the first heating estimation value of each of the plurality of LED pixels is greater than or equal to a first threshold value, and wherein the modifying the average brightness value comprises modifying the obtained average brightness value based on the second heating estimation value.

16. The method of claim 15, wherein the compensating the average brightness value comprises:

obtaining luminance adjustment information corresponding to the input image based on the average value of the first heating estimation value of each of the plurality of LED pixels being greater than or equal to a second threshold value; or obtaining the luminance adjustment information corresponding to the input image based on the ratio of the pixel region in which the first heating estimation value of each of the plurality of LED pixels is greater than or equal to the first threshold value being greater than or equal to a threshold ratio.

17. The method of claim 15, wherein the obtaining the heating estimation data comprises:

adjusting the first heating estimation value by applying heat diffusion modeling data to the first heating estimation value; and obtaining the second heating estimation value corresponding to the input image based on the adjusted first heating estimation value, and wherein the modifying the average brightness value comprises modifying the obtained average brightness value based on the second heating estimation value.

18. The method of claim 12, further comprising:

obtaining an average temperature value corresponding to the display panel based on a temperature value obtained by each of a plurality of temperature sensors included in a plurality of different regions of the display panel, and wherein the driving the display panel comprises based on the average temperature value being greater than or equal to a threshold temperature, driving the display panel based on the modified average brightness value.

19. The method of claim 12, wherein the obtaining the heating estimation data comprises:

obtaining heat conversion rate information of each of the R, G, and B sub-pixels corresponding to a temperature value obtained by each of a plurality of temperature sensors included in a plurality of different regions of the display panel, and obtaining the heating estimation data based on the heat conversion rate information of each of the R, G, and B sub-pixels, and wherein the compensating the average brightness value comprises modifying the obtained average brightness value based on the obtained heating estimation data.

20. The method of claim 12, wherein the driving the display panel comprises:

based on an event occurring, modifying the obtained average brightness value based on the heating estimation data of the input image, and driving a panel driver of the display apparatus based on the modified average brightness value, and wherein the event comprises at least one of a moving image reproduction stop event, a still image reproduction event, a graphical user interface (GUI) display event, or a reproduction event for a threshold time or more.

21. The method of claim 12, wherein the average brightness value comprises obtaining an average brightness value for each frame, among a plurality of frames, in the input image, and wherein the obtaining the heating estimation data comprises obtaining heating estimation data for each of the plurality of frames based on the gray level value and the heating characteristic information, and wherein the modifying the average brightness value comprises modifying the average brightness value based on the heating estimation data for each of the plurality of frames, and wherein the driving the display panel comprises driving a panel driver of the display apparatus based on the modified average brightness value by frames.

22. The display apparatus of claim 11, wherein the gray level value comprises a first gray level value corresponding to the R sub-pixel, a second gray level value corresponding to the G sub-pixel, and a third gray level value corresponding to the B sub-pixel, and wherein the heating estimation data of the input image is obtained by:

performing a first calculation based on the first heating characteristic information and the first gray level value, performing a second calculation based on the second heating characteristic information and the second gray level value, performing a third calculation based on the third heating characteristic information and the third gray level value.

23. A display apparatus comprising:

a display panel comprising a plurality of light emitting diode (LED) pixels;

a panel driver configured to provide a driving signal to the display panel to drive the display panel;

a memory storing heating characteristic information of each of a red (R) sub-pixel, a green (G) sub-pixel, and a blue (B) sub-pixel included in each of the plurality of LED pixels; and a processor configured to:

obtain an average brightness value corresponding to an input image based on a gray level value of the input image, obtain heating estimation data of the input image based on the gray level value of the input image and the heating characteristic information stored in the memory, the heating characteristic information including power information of each of the R sub-pixel, the G sub-pixel, and the B sub-pixel separately correlated for each gray level, modify the obtained average brightness value based on the heating estimation data, and control the panel driver based on the modified average brightness value, wherein the heating characteristic information comprises first heat conversion rate information including a first rate of change of heat conversion corresponding to the R sub-pixel, second heat conversion rate information including a second rate of change of heat conversion corresponding to the G sub-pixel, and third heat conversion rate information including a third rate of change of heat conversion corresponding to the B sub-pixel, and wherein the first rate of change is greater than the second rate of change.

* * * * *